United States Patent [19]

Cintra

[11] Patent Number: 5,583,702
[45] Date of Patent: *Dec. 10, 1996

[54] OPTICAL SYSTEM FOR ENLARGING IMAGES

[76] Inventor: Daniel Cintra, 9 Rue Bosman, Colombes 92700, France

[ * ] Notice: The terminal 37 months of this patent has been disclaimed.

[21] Appl. No.: 551,529

[22] Filed: Jul. 11, 1990

[51] Int. Cl.⁶ .............................. G02B 3/08; G02B 13/18
[52] U.S. Cl. ........................ 359/743; 359/708; 359/742
[58] Field of Search ................................. 350/452, 432, 350/433, 419, 451; 359/741, 742, 743, 708, 710, 666

[56] References Cited

U.S. PATENT DOCUMENTS 3,523,721  8/1970  Hofmann ............................. 350/452

FOREIGN PATENT DOCUMENTS 1346696  11/1963  France .
1379018  10/1964  France .
2472197  6/1981  France .
902535  8/1962  United Kingdom .

Primary Examiner—Scott J. Sugarman
Attorney, Agent, or Firm—Harrison & Egbert

[57] ABSTRACT

Optical system intended to enlarge images, such as those produced by a television set. For this purpose is used an optical system such as an assembly including at least one thick lens (12) or its equivalent (for example a Fresnel lens), placed very close to the image (10) to be enlarged, that allows an enlarged image to be obtained, with the possibility for the observer (13) to move throughout a sufficiently wide zone while still observing an image without troublesome deformation.

11 Claims, 4 Drawing Sheets

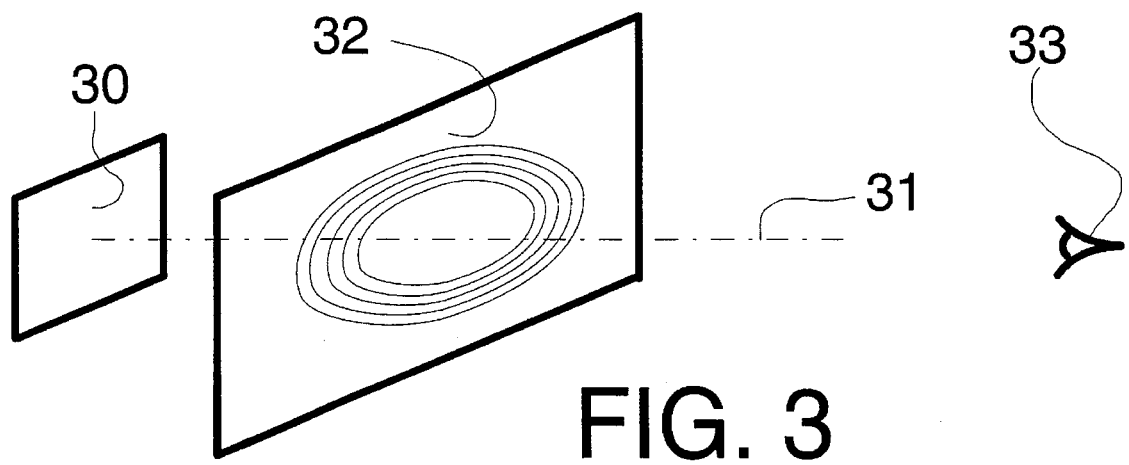
FIG. 3
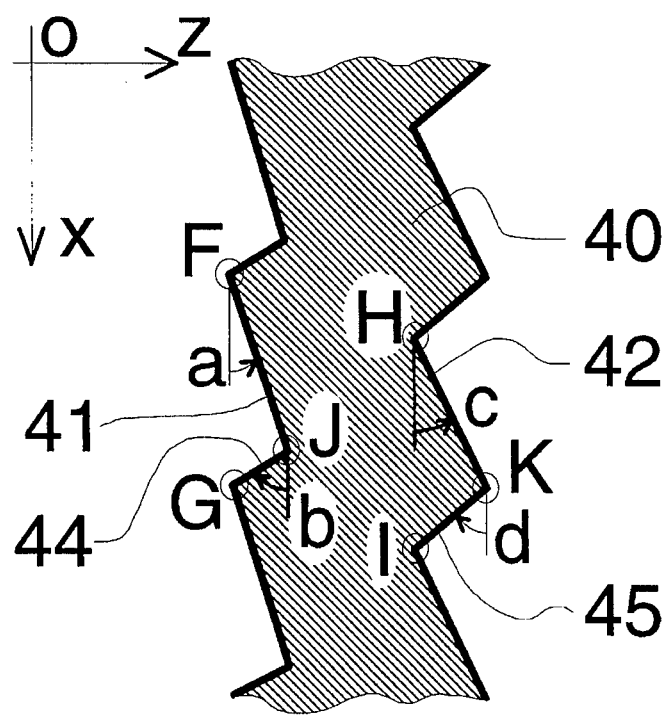
FIG. 4
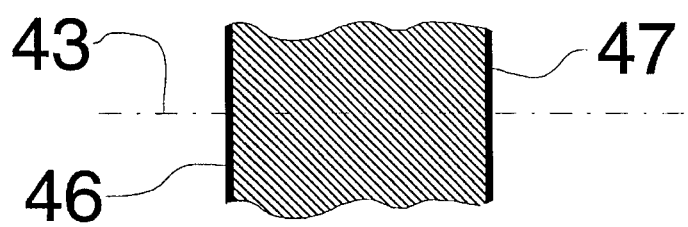

OPTICAL SYSTEM FOR ENLARGING IMAGES

TECHNICAL FIELD

The present invention concerns image enlargement such as those produced by television sets. For this purpose an optical system is used such as an assembly comprising at least one thick lens or its equivalent, that allows us to attain, starting from a real object, an enlarged image, with the possibility, for an observer to move through a wide zone while observing a correct image, that is to say without troublesome deformation.

BACKGROUND ART

In the present description, the "image generator" is denoted as any system that produces an image, such as a cathode ray tube, liquid crystal screen, plasma screen, thermoluminescence screen, hologram generator or any means of producing 2 or 3 dimensional images.

The "source image" is denoted as the image produced by the image generator; for example if the image generator is a cathode ray tube, the source image is carried on the screen of that tube.

The "axis" of the source image is the normal vector to the source image at its center.

In the case where the source image allows two distinct planes of symmetry, the source image "axis" is denoted as the intersection of these two planes, and the center of the source image is denoted as the intersection of that image with the image axis.

The "observer" is any person observing the enlarged source image through an image enlargement system.

The "thick lens" is a piece of transparent material, globally having the shape of a disk or rectangle, and bounded on each of its faces by a surface. Such a lens is not compelled to have a symmetry of revolution, and does not necessarily have a plane of symmetry.

In a section through a thick lens by a plane, it will be stated that, within the given plane, an intersection curve of the given plane and one of the faces of the lens is "convex" at a point V if, for every point W in the neighborhood of V, the segment VW is entirely within the transparent material comprising the lens. It will be stated that the given curve is "strictly convex" at V, if V and W are the only common points between the given segment VW and the surface of the cited lens.

Likewise, it will be stated that such a curve is "concave" at V, if the entire segment VW is entirely outside (outside the boundaries) of the transparent material.

A "Fresnel Lens" will be denoted as a form of achieving a thick lens, such a manufacturing method uses an echelon technique over at least a part of the so called Fresnel lens.

The "axis" of a lens is the normal vector to the lens at its center.

In the case where a lens allows two distinct planes of symmetry, the axis of such a lens is denoted as the intersection of these two planes, and the center of such a lens is denoted as the intersection of the lens with the lens axis.

The "optically useful part of the lens" is denoted as a part of the thick or Fresnel lens where light rays enter and leave, and take part in the enlargement effect of the source image.

A "Fresnel surface" is one of the two echelon surfaces of a Fresnel lens.

A "useful flank" surface is denoted as a flank where the light rays enter and leave which participate in the enlargement effect of the source image.

A "connection flank" on a Fresnel surface, is denoted as a flank where the light rays entering or leaving do not participate in the enlargement effect of the source image. Two successive useful flanks are connected either by zero connection flanks (case where two successive useful flanks have a common point), one or several connection flanks.

A "cylindrical lens" is denoted as a thick or Fresnel lens generated by a closed plane surface moving in a straight line.

A "diagonal" of an image is the distance between two points of the image that are the farthest from each other. In the case where the image is rectangular, its "diagonal" is the rectangle's diagonal.

The "effective enlargement" is the ratio between the tangent of the angle under which a linear segment of a virtual image, produced by an optical system, is viewed by an observer, and the tangent of the angle under which the linear segment of the corresponding source image would be viewed by the same observer if the optical system were absent.

The "observation zone" is the zone where the observer can be located in order to observe a correct image. In the case where the optical image possesses a symmetry of revolution, the observation zone is a cone having for its axis the lens's axis, and its peak at the center of the lens face on the observer's side. The observation zone is characterized by the "aperture" of the system, which is the half angle at the peak of the cone.

There exist optical techniques for forming a technological background plane. Their technical domain and the optical problems to resolve are not those of the present invention. U.S. Pat. No. 3,936,151 describes an optical system carrying a lens having a convex face at the center and concave at the periphery, formed according to a non-circular echelon technique, and a plane face. The light source is a point. GB-A-902 535 describes a lens producing a collimated beam of rays, coming exclusively from a point light source (focus of the lens). U.S. Pat. No. 4,423,438 describes a projection system for television images producing a real image. A Schmidt lens is used to correct for spherical aberration. This lens has a plane face. U.S. Pat. No. 3,980,399 describes a manufacturing process of a lens having a convex profile at the center and concave at the periphery, on the two lens faces.

The known systems for image enlargement are described in FR-A-1 346 696, FR-A-1 379 018, FR-A-2 472 197 and in U.S. Pat. No. 3,418,426. In these known systems a Fresnel lens is used, to produce an enlarged virtual image of a source image that can be formed by a television screen. FR-A-2 472 197 describes a Fresnel lens simulating a thick lens of revolution, where the face on the source image side is concave in the central region of the thick lens, and convex in the peripheral region, and where the face on the observer's side is everywhere convex.

The disadvantages of the system cited above are the following:

the observation zone is very reduced (except for FR-A-2 472 197);

the space taken up by the system is significant, specially for FR-A-2 472 197, where a part of the lens is at a distance from the source image equal to the diagonal of the source image, and where on the other hand, the lens itself is of significant size.

In contrast, the system according to the present invention, presents the following advantages:

the system permits the enlargement of the source image to an effective enlargement of the order of 2, without notable image deformation;

the observation zone is at least as wide as the FR-A-2 472 197 system;

significantly less space is taken up than the system presented under FR-A-2 472 197.

SUMMARY OF THE INVENTION

According to the present invention, the optical system for enlarging images comprises at least a thick lens or its equivalent, arranged between on the one hand a source image composed of a multiplicity of points and possessing an axis, and an observer on the other hand; moreover there exists a plane parallel to the axis of the source image, and cutting said system in such a manner that the intersection of the plane and the system in question, forms a convex curve at least in the central part (near the axis) and concave in its peripheral part (further from the axis); furthermore a plane exists parallel to the source image axis and cutting the system in such a manner that the intersection of such a plane and the system forms a curve which is entirely convex, and which is strictly convex over at least one part of the said curve (this is to say the curve can only be rectilinear in part and not over its whole extent).

In a variation of the present invention, the cited wholly convex curve is wholly strictly convex.

The invention will be understood better, and its other purposes, advantages and its characteristics appear more clearly in reading the description which follows, given under the non-restrictive heading, of two execution modes, and for which three sets of drawings are attached, regarding which:

BRIEF DESCRIPTION OF THE DRAWINGS

FIG. 3 is a view in perspective of the system according to the present invention, in which the optical part is a Fresnel lens, which can be executed in a compound such as methyl polymethylacrylate.

FIG. 4 is a view in partial section of the lens from FIG. 3. This view specifies the parameters for the quantitative definition of a preferred embodiment of the present invention.

DETAILED DESCRIPTION OF THE INVENTION

Figure 1:
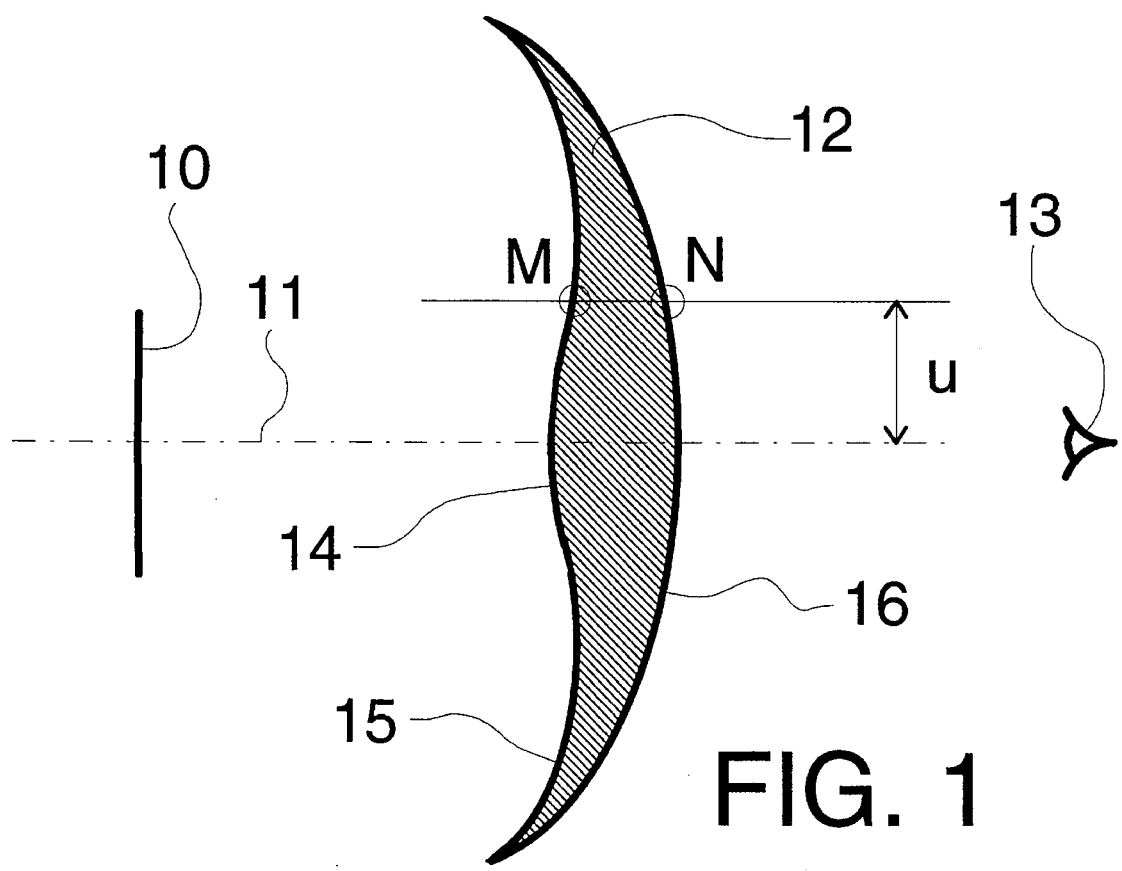
FIG. 1 is a sectional view of the system according to the present invention, in which the optical part is a thick lens, which can be executed in a compound such as methyl polymethylacrylate.

In FIG. 1 can be seen an embodiment of the present invention, in section and viewed from above. The source image 10 is distinguished, a thick lens 12, and the observer 13. In such an embodiment, it is supposed that the source image 10 has an axis 11. The sectional plane is parallel to the axis 11. In the present case it contains axis 11. On the source image side, the intersection curve of the thick lens and the sectional plane is convex in the central part 14, and concave in the peripheral part 15. On the observer side, the curve 16, intersection of the cited lens and the sectional plan, is everywhere convex, and strictly convex over at least a part of the curve. The lens 12 does not necessarily have a symmetry of revolution. Equally a point M can be distinguished situated on the curve 14, 15, on the source image side, and a point N situated on curve 16. The points M and N are situated in the sectional plane, and are situated at the same distance u from the mentioned axis. In a variation of the present invention, the distance from M to N is a decreasing function of the distance u. One particular case of this variation is that where the lens 12 possesses a symmetry of revolution with respect to axis 11.

Figure 2:
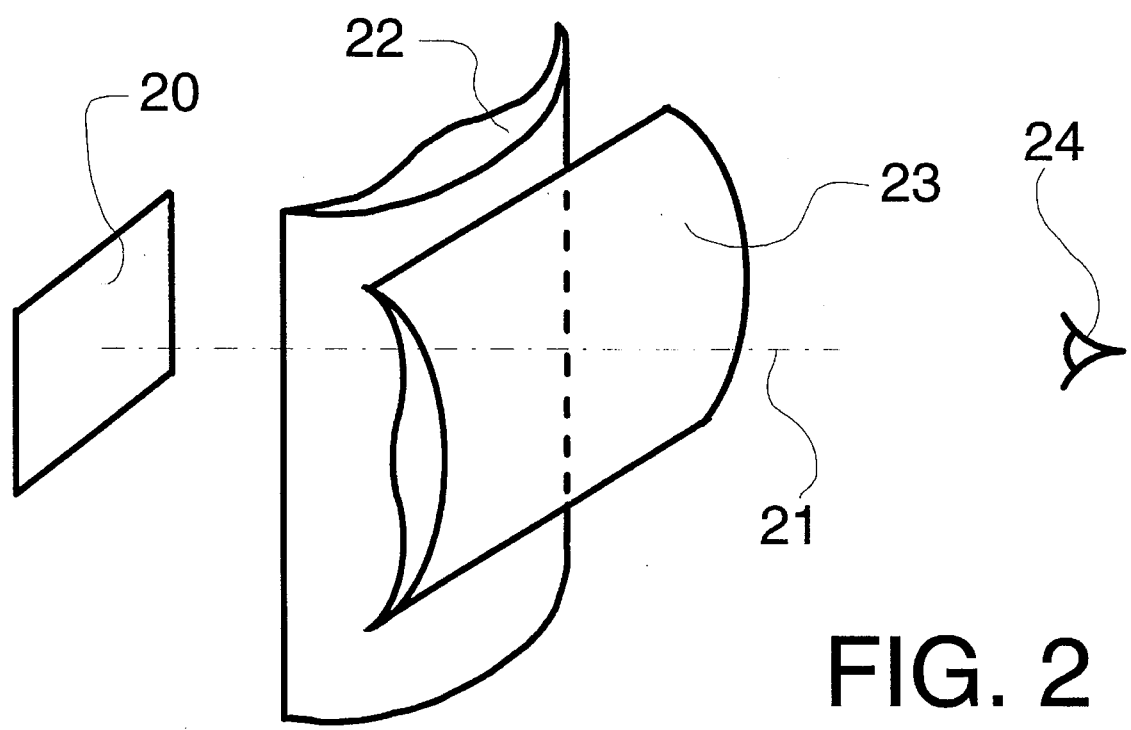
FIG. 2 is a view in perspective of the system according to the present invention, in which the optical part is a pair of thick cylindrical lenses.

In FIG. 2, another embodiment of the present invention, is represented in perspective. A source image 20 is distinguished and its axis 21, a first thick cylindrical lens 22, vertical generator (curve), a second thick cylindrical lens 23, horizontal generator, and an observer 24. The base surfaces of the cylinders possess the same properties as the cross sectional view of lens 12 in FIG. 1. A variant of this execution based on cylindrical lenses is formed by lenses of a cylindrical kind, but in which the form of the base varies slightly as a function of the displacement along the generator (curve).

In FIG. 3, is distinguished a source image 30, and its axis 31, a Fresnel lens 32 according to the present invention, and the observer 33. Here the lens 32 has an axis which is also the source image axis 31. In a variation, the lens 32 should only be allowed one vertical symmetry plane containing the source image axis 31. In another variation, the lens 32 should be able to have a different axis from the source image, but preferably parallel to the source-image axis.

FIG. 4 is a view in partial section of lens 32, FIG. 3, a section through the vertical plane containing axis 31. The Fresnel lens 40 can be distinguished and its axis 43; an active flank 41 and a connecting flank 44, situated on the source side; an active flank 42 and a connecting flank 45 situated on the observer side; the edges F and J of the flank 41, F being further from the axis 43 than J; the edges H and K of flank 42, H being further from the axis 43 than K; the edge G of flank 44, G being nearer from axis 43 than J; the edge I of flank 45, I being closer to axis 43 than J; a marker Oxz; O being above the axis 43; Oz being parallel with axis 43 and pointing towards the observer, Ox being perpendicular to axis 43 and pointing towards axis 43. Under these conditions, the flank FJ will be defined by the oriented angle a=(Ox,FJ), and the flank HK by the inclined angle c=(Ox, HK), in the same manner b and d are the angles defined by the connecting flanks such as 44 and 45. We have: b=(Ox, JG) and d=(Ox, KI).

For a given flank, the oriented angle such as (Ox,FJ) will be called the "inclination angle" of the flank. In FIG. 4, it is seen for example that angles a and c defining the flanks FJ and HK are positive and less than φ/2 radians π/2 angles b and d are negative and greater than −φ/2 radians. To define a flank such as FJ, the distance is also introduced between the middle of this flank (middle taken in the plane of the section, that is to say in the plane of FIG. 4) and axis 43; this distance will be called the distance of the "flank from the axis".

If at one point such as F or J the angle formed by the two contiguous flanks, measured from the interior of the lens material, is less than π radians in absolute value, it is said that such a point is a "crest"; in the case where such an angle has an absolute value greater than π radians, it is said that such a point is a valley. In FIG. 4, one sees that F is a crest, while J is a valley.

The group comprised by two contiguous flanks such as FJ and JG, joining in a valley, is called a "groove". The "width" of a groove is the distance between two successive crests such as F and G. The grooves generally have a constant width on the face of a Fresnel lens. But it is also possible to have variable width grooves.

The "inflection radius", within a cross-section plane such as FIG. 4, is the distance between the axis and the first useful flank (starting from axis 43) for which the function giving the inclination angle as a function of the distance of the flank from the axis changes of variation direction, the first flank not being the one located on axis 43.

The "flatness radius", in a cross-section plane such as FIG. 4, is the distance between the axis and the first useful flank (starting from axis 43), having a null inclination angle, such a flank not being the one located on axis 43. In general the flatness radius is not equal to the inflection radius.

The Fresnel lens 32 is fabricated following an echelon technique to simulate the thick lens 12. The two faces are entirely executed with the echelon technique. However, with these echelons techniques, only one of the two faces can be executed, or only a part of each of the two faces, or a part of only one face. For lens 32, the functions representing the inclination angles of the useful flanks 41 and 42 as a function of the distance from such flanks to the axis 43 of lens 32, have the following characteristics:

for the useful flanks on the source image side, the function is decreasing up to a distance of the order of the inflexion radius, then increasing;

for the useful flanks on the observer side, the function is increasing.

In the case where only a part of the face is executed with echelons, the decreasing and increasing characteristics and the characteristics indicated above only concern that particular part. In the case where the face does not have any part executed in echelons, these characteristics do not apply to that face. Thus, one will have, in a general fashion:

for the part executed in a Fresnel technique on the image side face, the function representing the useful flanks is first decreasing and then increasing;

for the part executed in a Fresnel technique on the observer side face, the function representing the useful flanks is increasing.

Moreover, in the present invention, the function giving the inclination angle of the useful flanks 41 and 42 as a function of the distance of such flanks from the axis 43 of the Fresnel lens are such that, at every point of the lens, the function giving the inclination angle of the useful flank 42 on the observer side, has a value greater than that of the function giving the inclination angle of the useful flank 41 on the source image side.

A way of reducing the parasite rays passing through the connecting flanks is to make sure that the functions giving the inclination angles of the connecting flanks as a function of the distance of such a flank from the center of the Fresnel lens, have the following characteristics:

for the connecting flanks on the source image side, the function should be decreasing up to a distance of the order of the inflection radius, then increasing, with a discontinuity for x=flatness radius;

for the connecting flanks on the observer side, the function should be increasing up to a distance of the order of the inflexion radius, then decreasing up to a distance of the order of three times the inflexion radius, then increasing.

In a first mode of preferred embodiment of the present invention, tests have shown that we have:

$$\frac{E}{(0.0164\,k - 0.0298)\,\alpha^2 + (1.206 - 0.7\,k)\,\alpha + 7.334\,k - 11.042} + \frac{r}{0.6\,k - 0.555} = \frac{D}{0.70}$$

Where:

E is the distance in meters between the lens and the source image, k is the effective enlargement of the system, α is the aperture of the system in degrees, r is the inflection radius in meters, D is the source image diagonal in meters.

E varies from 0.3 D to 1.5 D; k varies from 1.7 to 2.7; φ varies from 14° to 36°.

In a second preferred execution mode of the present invention, tests have shown that, for a source image with 70 cm diagonal, with a lens composed of a material where the refractive index is 1.49, measuring 80 cm high and 1.60 m. wide, located at 30 cm. from the source image, and displaying grooves having a width of 1 mm. and having a symmetry of revolution, the inclination angles of the grooves are according to the following polynomial formulae (We note that Rp is the value of x between 0.3 and 0.4 such that a (Rp)=0; then we have approximately: Rp=0.32; Rp is the flatness radius:

source image side face, useful flanks:

$$a(x) = -1.24219\,x + 6.18925\,x^2 - 8.90201\,x^3 + 6.12359\,x^4 - 1.71876\,x^5$$

source image side face, connecting flanks:

for x<Rp: $b(x) = 2.580 - 2.500\,x + 13.500\,x^2 - 5.000\,x^3$ for x≧Rp: $b(x) = 0.2426 + 2.373\,x - 1.716\,x^2 + 0.4004\,x^3$ observer side face, useful flanks:

$$c(x) = 0.845088\,x + 7.61459\,x^2 - 13.7247\,x^3 + 8.620528\,x^4 - 1.855738\,x^5$$

observer side face, connecting flanks:

$$d(x) = 0.9000 + 14.435\,x - 109.74\,x^2 + 280.03\,x^3 - 295.86\,x^4 + 111.93\,x^5$$

where x is the distance from the flank to the axis, expressed in meters, and where a(x), b(x), c(x) and d(x) are in radians.

A skillful person will be able to adapt these formulae for materials where the refractive index is different from 1.49.

On each face of the lens 40, the useful flanks and the connecting flanks alternate. At the center of lens 40, we start from the useful flank 46 source image side, and a useful flank 47 on the observer side.

Figure 5:
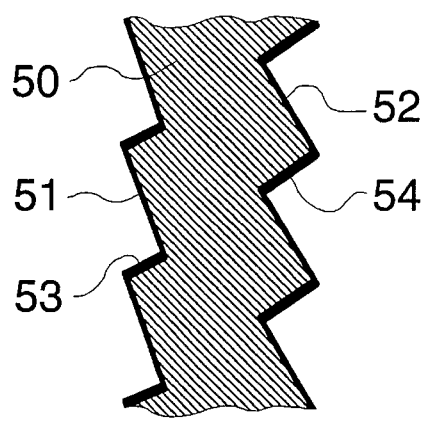
FIGS. 5, 6 and 8 are the views in partial section of the Fresnel lenses from the present invention, illustrating the means for reducing the parasite rays transmitted by such lenses.

For the connection flanks passing parasitic light, the effects of this light can be reduced, by calculating these reflection flanks optimize said effects. The reflection flanks can also be made opaque as indicated in FIG. 5. A Fresnel lens 50 is distinguished there with useful flanks 51 and 52, and with the flanks 53 and 54. The connecting flanks can be include opaque on the two faces or on only one face, or on certain regions of at least one of the two faces. The opacification of the flanks in FIG. 5 can be done by deposition, silk-screen printing (serigraphy), projection or cathodic process.

Figure 6:
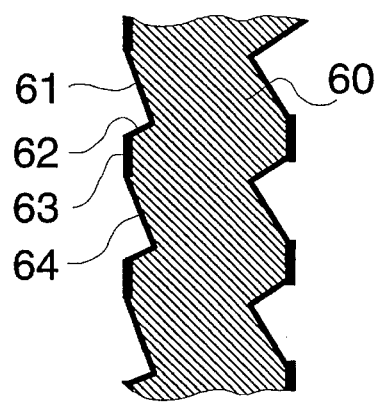

FIG. 6 shows a different layout of the flanks. There a Fresnel lens 60 is distinguished, useful flanks 61 and 64, and the connection flanks 62 and 63.

Here there are two connecting flanks, not just a single one, between two successive useful flanks. Flank 62 has a variable inclination angle. Flank 63 has a null inclination angle.

This enables flanks such as flank 63 to be easily opacified, for example with a simply silk-screen marking.

Figure 8:
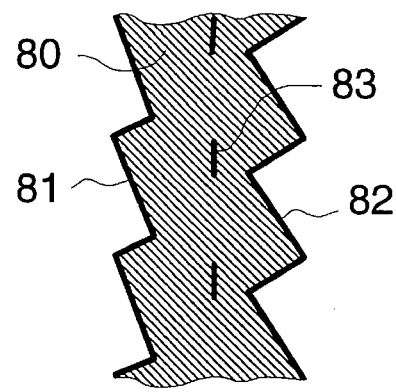

Another manner of reducing the effects of parasitic light rays, is to place between the faces of the Fresnel lens a mask opaque to certain directions only. Thus FIG. 8 shows a Fresnel lens 80, with useful flanks 81 and 82, and a mask 83. If the lens has a symmetry of revolution, the mask can equally have the same symmetry, and be composed of a series of opaque rings, situated in a plane perpendicular to the axis of lens 80.

Figure 7:
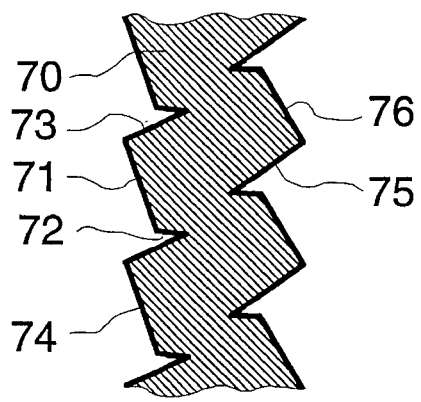
FIG. 7 is a partial sectional view of a Fresnel lens from the present invention, illustrating the means permitting the modification of the deflection characteristics of the light rays by such a lens.

Similarly we can seek to modify the way in which two useful flanks deviate the light. Two useful flanks such as flanks 41 and 42 of FIG. 4 behave as a prism. To this deflection effect of the light can be added a reflection effect using the phenomenon of total reflection. A first means of achieving it is to use the connecting flanks, by giving them an inclination angle such that there is total reflection of the light that has penetrated into a material via a useful flank. Another means of achieving it is represented in FIG. 7. A Fresnel lens 70 is distinguished, the useful flanks 71 and 74, the connecting flanks 72 and 73. Here as in FIG. 6, there are two connecting flanks, not just one, between two successive useful flanks. Flank 72 has a variable inclination angle. Flank 73 has an inclination angle such that the light penetrating the lens via the useful flank 74 undergoes total reflection on flank 73. Thus there is refraction on flank 74, followed by an internal reflection within the lens on flank 73. On the observer side face, in the same manner, the connecting flank 75 can be arranged so as to cause total internal reflection within the lens, before exiting via the useful flank 76. The combination of the two successive total reflections allows a deflection of the light to be made, this deflection being combined with the deflections caused by the useful flanks on entry and exit.

A reflection effect can also be obtained on a connecting flank by depositing on the flank a layer of light reflecting product. On the other hand a light reflecting and opacifying product can be used in association on the same flank.

Figure 9:
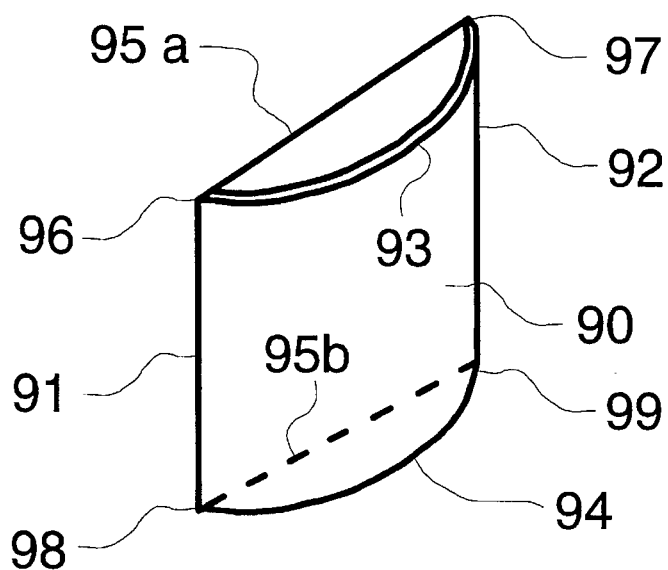
FIG. 9 is a perspective view of a lens (either thick or Fresnel) from the present invention, provided with a device allowing the deformation of such a lens.

In FIG. 9, is distinguished, in a perspective view, a lens 90 (thick or Fresnel) of a global rectangular form, with two vertical edges 91 and 92, and two horizontal edges 93 and 94. In addition a bar 95a can be distinguished, joining the two upper corners 96 and 97 of lens 90. By varying the length of the bar the lens 90 is deformed, thus modifying the lens curvature, and also modifying as a result the optical effect produced by the lens. One can also arrange another bar 95b on the lower corners 98 and 99 of lens 90.

The modification of the optical effect can serve to enlarge the image preferentially for example in the horizontal direction, or to correct some virtual image deformations produced by the lens. Instead of bars in FIG. 9, heating resistances and shape-retentive memory alloys can be used.

Figure 10:
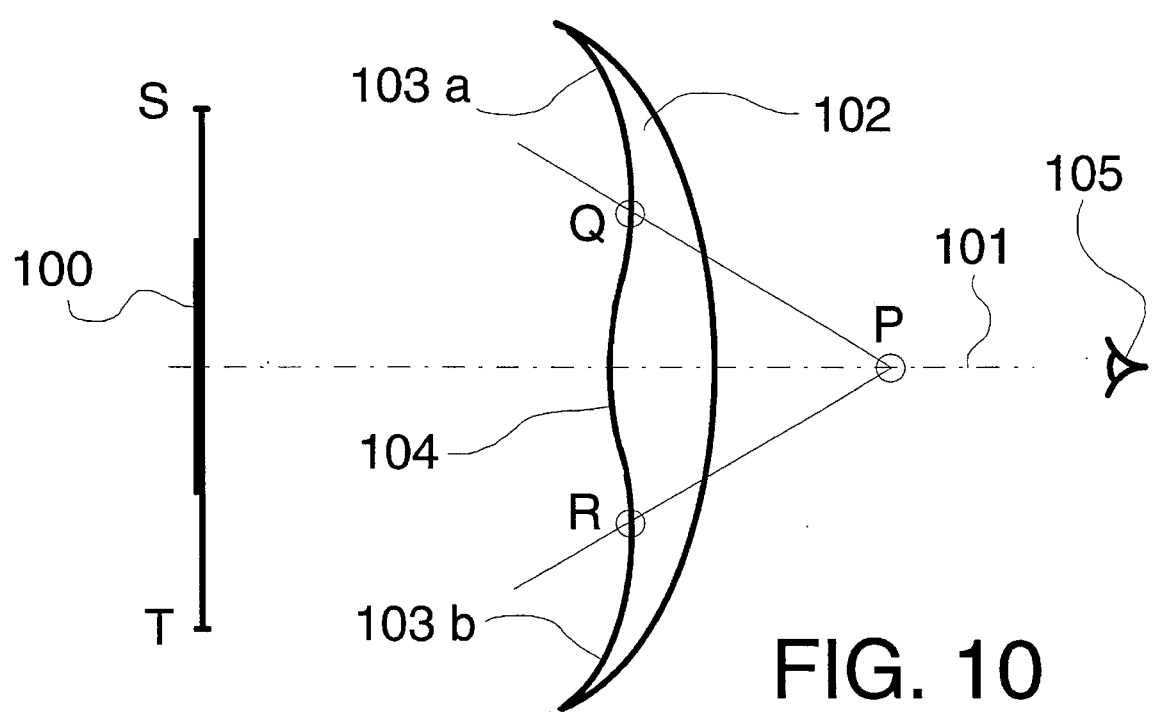
FIG. 10 is a sectional view allowing the importance of the convex region of one of the faces of the optical system, according to the present invention, to be specified.

In FIG. 10 a source image 100 and its axis 101 are represented schematically, viewed in section, a point P on axis 101, and a lens 102, according to the present invention, placed between the source image 100 and the point P. The observer 105 can also be distinguished. The point P is situated between the source image and the observer 105. The sectional plane is, according to the present invention (see description of FIG. 1), parallel to the axis of the source image 100, and such that, on the source image 100 side, the lens face 102 has an intersection with the plane section which is a curve where a central region 104 is convex and where a peripheral region 103a and 103b is concave. In FIG. 10 are similarly distinguishable a straight line segment ST, situated in the section plane of FIG. 10; the straight line segment is perpendicular to the axis 101 of the source image 100; the straight line segment has as its center the center of the source image 100, and for its length the source image 100 diagonal.

In FIG. 10 are also represented the points Q and R that form the border line between the central region 104 and the peripheral region 103. The angle under which P views the central region is the angle (PQ, PR). The half angle of this angle is denoted as $\beta$. The angle from which P views the segment ST is the angle (PS, PT). The angle equal to the half of (PS, PT) is denoted. In the case of a thick lens such as lens 102, the "radius of inflexion" is half the length QR. Let z be the distance from P to the source image.

The position of the point P is defined by:

$$z=[(0.0164k-0.0298)\alpha^2+(1.206-0.7k)\alpha+7.334\ k-11.042]\ D/0.70$$

with the notations and the conventions defined previously for the first preferred embodiment the present invention. Under these conditions the tests have shown that the tangent of angle $\beta$ is of the order of:

$$\text{Tan } \beta=(0.6\ k-0.555)D/(z\ 0.70) \tag{1}$$

It is noticed that the tangent does not depend on the distance between the source image and the lens for a given k and $\alpha$. The tangent of angle $\Gamma$ is given by:

$$\text{Tan } \Gamma=D/2z \tag{2}$$

that is to say we have:

$$\text{Tan } \beta = \frac{(0.6\ k - 0.555)}{0.35}\ \text{Tan } \phi \tag{3}$$

For example, if k=2 and if $\alpha$=26°, the distance z from P to the source image is equal to 0.93 times the diagonal of the source image, and $\beta$ is about 44.7°, from formula (1) above; its tangent is 0.991. Moreover, $\Gamma$ is 28.3°; its tangent is 0.538. And in addition, we have (0.6 k −0.555)/0.35=1.84. It is verified that 0.991/0.538=1.84.

In a variation of the lens according to the present invention, a transparent material can be used treated in a manner so that the transmission factor of the light by the lens diminishes in the presence of radiation of an intensity significantly greater than the maximum intensity of the source image. This allows the attenuation of possible dazzling or too strong a contrast in the case where significant light reaches the lens. Methods can be used such as those used in sunglasses with variable opacity, or used in liquid crystal systems.

Lastly in a variation of the lens according to the present invention, the lens can be manufactured with a material sufficiently flexible so as to be able to give it a curvature, at least locally.

This flexibility allows the lens to be wound around an axis so as to reduce the space taken up when not in use.

Clearly, a man of talent would be able to supply numerous modifications to the present invention without leaving the scope of the (inventive) claims.

I claim:

1. An optical system for image enlargement, arranged between a source image (10) having a center and a diagonal and composed of a multiplicity of points and possessing an axis (11), and an observer; said optical system comprises optical surfaces and at least a lens (12) wherein a first plane is parallel to the axis of the source image said first plane cutting said system in such a manner that the intersection of the plane and said optical surfaces forms a curve being convex in at least a central part (14) and concave in a peripheral part (15), a special plane parallel to the axis and cutting the system in such a manner that an intersection of said second plane and the optical surfaces forms a curve (16) which is substantially convex and which is strictly convex over at least a portion of the said curve.

2. The optical system according to claim 1, wherein at least one of the optical surfaces contains a part replaced by Fresnel echelons defining useful flanks and connecting flanks, said part being optically simulated by said Fresnel echelons.

3. The optical system according to claim 2, characterized by the functions representing the inclination angles of the useful flanks (41, 42) as a function of the distance of such flanks from the Fresnel lens axis (43) having the following characteristics:

for the part executed in Fresnel technique on the source image side face, the function representing the useful flanks is first decreasing, then increasing;

for the part executed in Fresnel technique on the observer side, the function representing the useful flanks is increasing.

4. The optical system according to claim 2, characterized, in that the functions giving the inclination angles of the connecting flanks (44,45), as a function of the distance of such flanks from Fresnel lens axis (43) have the following characteristics:

for the connecting flanks of the source image side face, the function is decreasing up to a distance of the order of the inflexion radius, then increasing, with a discontinuity at x=flatness radius;

for the connecting flanks of the observer side face, the function is increasing up to a distance of the order of the inflection radius, then decreasing up to a distance of the order of three times the inflection radius, then increasing.

5. The optical system according to claim 2, characterized in that the form in which the lens is manufactured is sufficiently flexible to allow the lens to rolled up.

6. The optical system according to claim 1, wherein, in said first plane, the angle $\beta$ equal to half an angle from which said central part is viewed from a point located on said axis, between the source-image and the observer, and at a distance z from the source-image, is related to an angle $\Gamma$, equal to half an angle from which a straight line segment is viewed, perpendicular to said axis, said straight line segment having a center being same that the source-image center, and having a length equal to the diagonal of the source-image, the relation between $\beta$ and $\Gamma$ being the following:

$$tg\,\beta = \frac{0.6\,k - 0.555}{0.35}\,tg\,\Gamma$$

z being defined by:

$$z = [(0.0164\,k - 0.0298)\alpha^2 + (1.206 - 0.7\,k)\alpha + 7.334\,k - 11.042]\,D/0.70$$

where:

k is the effective enlargement of the system $\alpha$ is the aperture of the system in degrees, D is the source-image diagonal in meters.

7. The optical system according to claim 1, wherein a plane contains said axis, a section of at least two of said optical surfaces through said plane containing two curves, a span between one first point located on one of the curves and a corresponding second point located on the other curve, said first point and said second point being at the same distance from said axis, is a decreasing function of said distance.

8. The optical system according to claim 2, wherein functions giving inclination angles of a first useful flank, on an observer-oriented side, and a second useful flank, on a source-image oriented side, versus a distance from a Fresnel lens axis to said flanks, are such that at every point of the lens, in a plane cutting said lens, the function giving the inclination angle of said first useful flank has a value greater than the value of the function giving the inclination angle of said second useful flank, said first flank and said second flank being located at the same distance from said axis.

9. The optical system according to claim 2, wherein some areas of at least one of Said surfaces is opaque.

10. The optical system according to claim 2, wherein it further includes a mask located between two of said optical surfaces.

11. The optical system according to claim 1, wherein a light-transmission factor of said system is reduced in presence of a radiation intensity significantly greater than a maximum radiation intensity of the source-image.

* * * * *